(12) United States Patent
Otake et al.

(10) Patent No.: US 12,423,939 B2
(45) Date of Patent: Sep. 23, 2025

(54) INFORMATION PROCESSING APPARATUS AND METHOD FOR CANDIDATE REGION MERGING

(71) Applicant: CANON KABUSHIKI KAISHA, Tokyo (JP)

(72) Inventors: Ritsuko Otake, Tokyo (JP); Hidetoshi Izawa, Kanagawa (JP); Tomoya Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 18/048,391

(22) Filed: Oct. 20, 2022

(65) Prior Publication Data

US 2023/0126046 A1 Apr. 27, 2023

(30) Foreign Application Priority Data

Oct. 22, 2021 (JP) .................................. 2021-172887
Oct. 22, 2021 (JP) .................................. 2021-172888

(51) Int. Cl.
*G06V 10/25* (2022.01)
*G06V 10/22* (2022.01)
*G06V 10/26* (2022.01)

(52) U.S. Cl.
CPC .............. *G06V 10/25* (2022.01); *G06V 10/22* (2022.01); *G06V 10/26* (2022.01)

(58) Field of Classification Search
CPC ......... G06V 10/25; G06V 10/26; G06V 10/22
See application file for complete search history.

(56) References Cited

FOREIGN PATENT DOCUMENTS

| CN | 111986252 A | * 11/2020 | ............... G06K 9/32 |
| JP | 6348368 B2 | * 6/2018 | ............. G06T 7/136 |
| JP | 2018180945 A | 11/2018 | |

OTHER PUBLICATIONS

Tianpeng Wu, et al., Score-Specific Non-Maximum Suppression and Coexistence Prior for Multi-Scale Face Detection, ICASSP 2019—2019 IEEE International Conference on Acoustics, Speech and Signal Processing (ICASSP), Brighton, UK, 2019, XP33565116.

* cited by examiner

*Primary Examiner* — Vu Le
*Assistant Examiner* — Matthew Bodnark
(74) *Attorney, Agent, or Firm* — Canon U.S.A., Inc. IP Division

(57) ABSTRACT

From an input image, a candidate area in which an object exists is acquired. Furthermore, a confidence score indicating a possibility that the object exists and a class probability are acquired. An overlap ratio between candidate areas is calculated for each combination of two arbitrary detection results, and a combination of detection results with an overlap ratio equal to or larger than a threshold value is output as an overlap-detected group. A candidate area used as a representative area is determined from detection results included in the overlap-detected group based on a confidence score. Each class index is calculated based on the overlap ratio with respect to the representative area, and a class with the highest class index is determined as the class of the representative area.

11 Claims, 15 Drawing Sheets

FIG. 4A
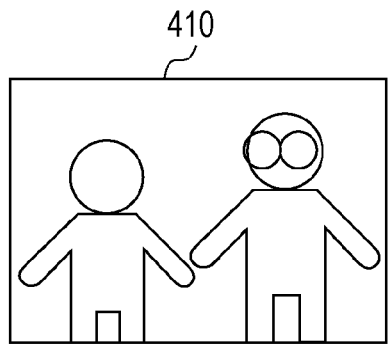
FIG. 4B
| DETECTION RESULT | (x1,y1),(x2,y2) | CONFIDENCE SCORE | CLASS PROBABILITY | |
| --- | --- | --- | --- | --- |
| | | | WEARING GLASSES | NOT WEARING GLASSES |
| A | (143,165),(417,418) | 0.80 | 0.55 | 0.45 |
| B | (166,190),(450,446) | 0.75 | 0.15 | 0.85 |
| C | (671,104),(903,332) | 0.60 | 0.70 | 0.30 |
FIG. 4C
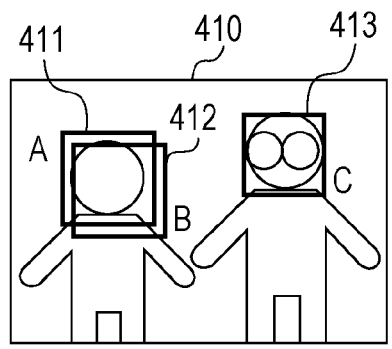

| DETECTION RESULT | (x1,y1),(x2,y2) | CONFIDENCE SCORE | CLASS | |
|---|---|---|---|---|
| | | | WEARING GLASSES | NOT WEARING GLASSES |
| A | (143,165),(417,418) | 0.80 | — | ○ |
| C | (671,104),(903,332) | 0.60 | ○ | — |

FIG. 6A
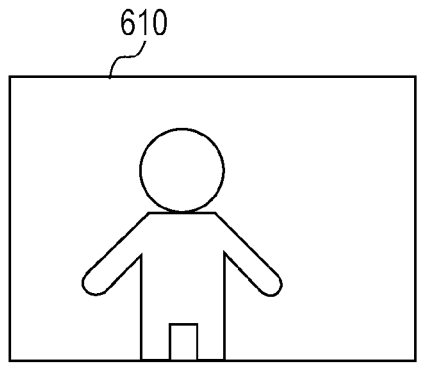
FIG. 6B
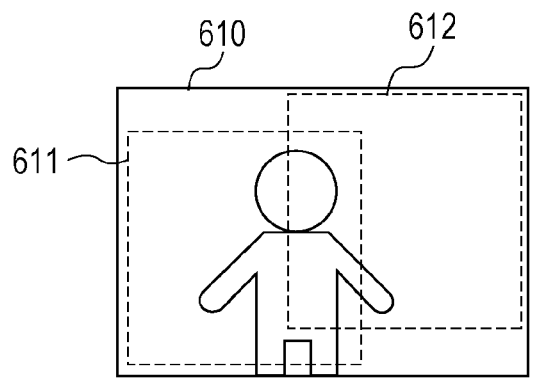
FIG. 6C
| DESIGNATED REGION | DETECTION RESULT | (x1,y1),(x2,y2) | CONFIDENCE SCORE | CLASS PROBABILITY | |
|---|---|---|---|---|---|
| | | | | WEARING GLASSES | NOT WEARING GLASSES |
| a | A | (410,145),(685,414) | 0.80 | 0.15 | 0.85 |
| b | B | (546,113),(705,440) | 0.85 | 0.30 | 0.70 |
| | C | (567,186),(660,384) | 0.70 | 0.60 | 0.40 |
DESIGNATED REGION a: UPPER LEFT COORDINATES (99, 127), LOWER RIGHT COORDINATES (719, 747)
DESIGNATED REGION b: UPPER LEFT COORDINATES (546, 10), LOWER RIGHT COORDINATES (1076, 540)

| DESIGNATED REGION | DETECTION RESULT | (x1,y1),(x2,y2) | CONFIDENCE SCORE | CLASS PROBABILITY ||
| | | | | WEARING GLASSES | NOT WEARING GLASSES |
|---|---|---|---|---|---|
| a | A | (410,145),(685,414) | 0.80 | 0.15 | 0.85 |
| b | B | (546,113),(705,440) | 0.68 | 0.30 | 0.70 |
| | C | (567,186),(660,384) | 0.70 | 0.60 | 0.40 |

| DETECTION RESULT | (x1,y1),(x2,y2) | CONFIDENCE SCORE | CLASS | |
| --- | --- | --- | --- | --- |
| | | | WEARING GLASSES | NOT WEARING GLASSES |
| A | (410,145),(685,414) | 0.80 | — | O |

FIG. 7A  FIG. 7B  FIG. 7C
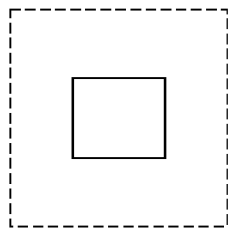 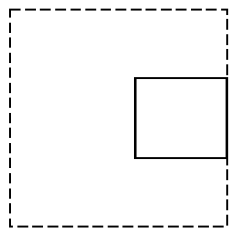 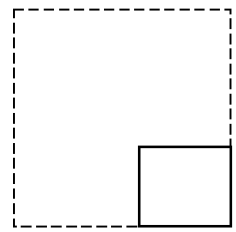
FIG. 7D  FIG. 7E  FIG. 7F  FIG. 7G
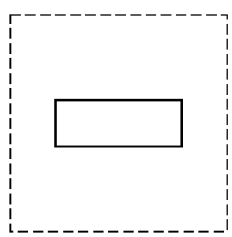 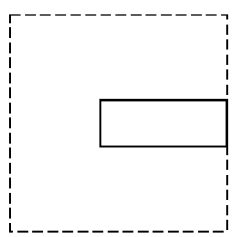 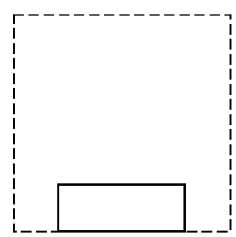 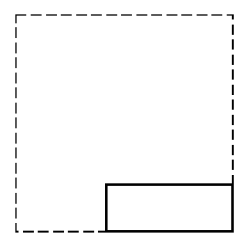

FIG. 8A
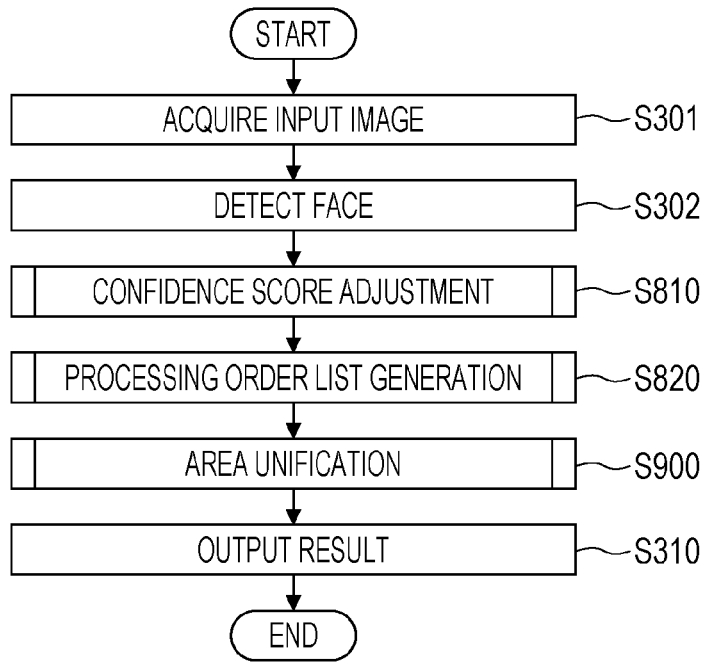
FIG. 8B
FIG. 8C
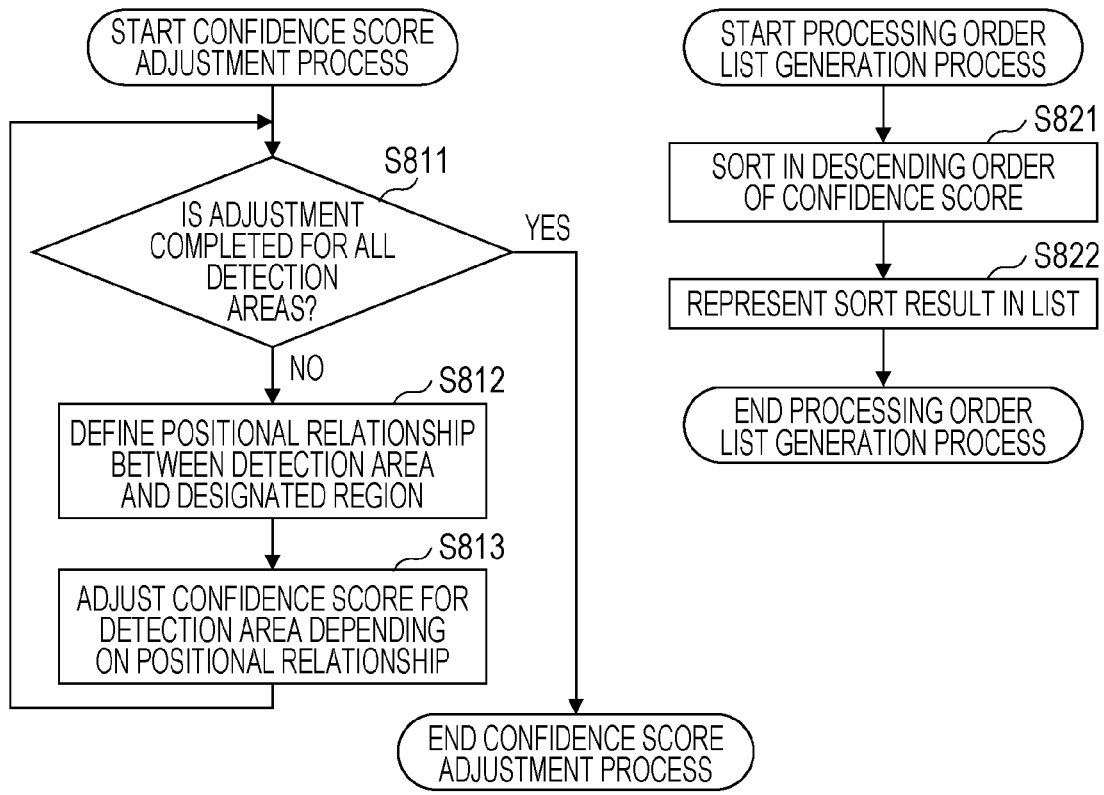

1010

| DESIGNATED REGION | DETECTION RESULT | (x1,y1),(x2,y2) | CONFIDENCE SCORE | CLASS PROBABILITY | |
|---|---|---|---|---|---|
| | | | | WEARING GLASSES | NOT WEARING GLASSES |
| a | A | (326,142),(580,352) | 0.80 | 0.15 | 0.85 |
| b | B | (455,100),(610,377) | 0.85 | 0.30 | 0.70 |
| | C | (678,156),(945,394) | 0.85 | 0.55 | 0.45 |
| | D | (720,180),(980,426) | 0.75 | 0.85 | 0.15 |

DESIGNATED REGION a: UPPER LEFT COORDINATES (28, 110), LOWER RIGHT COORDINATES (628, 710)
DESIGNATED REGION b: UPPER LEFT COORDINATES (455, 15), LOWER RIGHT COORDINATES (1055, 615)

| DESIGNATED REGION | DETECTION RESULT | (x1,y1),(x2,y2) | CONFIDENCE SCORE | CLASS PROBABILITY | |
|---|---|---|---|---|---|
| | | | | WEARING GLASSES | NOT WEARING GLASSES |
| a | A | (326,142),(580,352) | 0.80 | 0.15 | 0.85 |
| b | B | (455,100),(610,377) | 0.68 | 0.30 | 0.70 |
| | C | (678,156),(945,394) | 0.85 | 0.55 | 0.45 |
| | D | (720,180),(980,426) | 0.75 | 0.85 | 0.15 |

FIG. 10E

| PROCESSING ORDER | DETECTION RESULT |
|---|---|
| 1 | C |
| 2 | A |
| 3 | D |
| 4 | B |

FIG. 10F

| PROCESSING ORDER | DETECTION RESULT |
|---|---|
| 1 | C |
| 2 | A |
| 3 | B |

FIG. 10G

| PROCESSING ORDER | DETECTION RESULT |
|---|---|
| 1 | A |
| 2 | B |

FIG. 10H

| PROCESSING ORDER | DETECTION RESULT |
|---|---|
| 1 | A |

| DETECTION RESULT | (x1,y1),(x2,y2) | CONFIDENCE SCORE | CLASS | |
| --- | --- | --- | --- | --- |
| | | | WEARING GLASSES | NOT WEARING GLASSES |
| A | (326,142),(580,352) | 0.80 | — | ○ |
| C | (678,156),(945,394) | 0.85 | ○ | — |

INFORMATION PROCESSING APPARATUS AND METHOD FOR CANDIDATE REGION MERGING

BACKGROUND OF THE INVENTION

Field of the Invention

The present disclosure relates to a technique of detecting an object from an image.

Description of the Related Art

In recent years, image analysis has been used in various scenes such that an object is detected from an image captured by an imaging apparatus such as a surveillance camera or the like and the detected image is tracked, an attribute of the object is estimated, and/or the number of objects is estimated from an image analysis result.

Japanese Patent Laid-Open No. 2018-180945 discloses a technique in which a threshold value is adjusted depending on a type of a detection target object included in a candidate area, thereby preventing candidate areas of different types (attributes) from being unified. However, in this technique, when a plurality of different types of detection results are output for a single object, the candidate areas cannot be unified into one candidate area.

SUMMARY OF THE INVENTION

In view of the above, the present disclosure provides a technique of, even when a plurality of detection results with different attributes are obtained for one object, unifying candidate areas into one candidate area and selecting an appropriate attribute from a unified result.

In an aspect, the present disclosure provides an information processing apparatus including an object detection unit configured to detect, from an image, a candidate area in which an object is included and a candidate attribute of the object corresponding to the candidate area, an overlap determination unit configured to, in a case where a plurality of candidate areas exist, acquire an overlap ratio between the plurality of candidate areas, a representative area determination unit configured to set a representative area of candidate areas based on a confidence score indicating a probability that an object is included in the candidate area, an attribute determination unit configured to determine an attribute of an object in the representative area based on a probability of an attribute of an object included in the candidate area whose overlap ratio with respect to the representative area is equal to or greater than a threshold value and an overlap ratio with respect to the representative area, and a result correction unit configured to delete the candidate area whose overlap ratio with respect to the representative area is equal to or greater than the threshold value.

Further features of the present invention will become apparent from the following description of embodiments with reference to the attached drawings.

BRIEF DESCRIPTION OF THE DRAWINGS

FIGS. 4A to 4E are diagrams for explaining the object detection process according to the first embodiment.

FIGS. 6A to 6G are diagrams for explaining the object detection process according to the second embodiment.

FIGS. 7A to 7G are diagrams for explaining patterns in which a designated region and a candidate area are in contact with each other.

FIGS. 8A to 8C are flowcharts illustrating examples of procedures of object detection processes according to a third embodiment.

FIGS. 10A to 10J are diagrams for explaining the object detection process according to the third embodiment.

DESCRIPTION OF THE EMBODIMENTS

First Embodiment

In an object detection process, for example, a position, a size, and an attribute of a detection target object, a confidence score of existence of the object, and/or the like are output. In the object detection process, there is a possibility that a plurality of detection results occur for one object. This may cause a problem such as a reduction in reliability of detection results or a reduction in reliability of statistical data. A first embodiment described below discloses a method of, when a plurality of detection results occur for one object, determining an appropriate detection result. The first embodiment of the present disclosure is described below with reference to the drawings.

Figure 1:
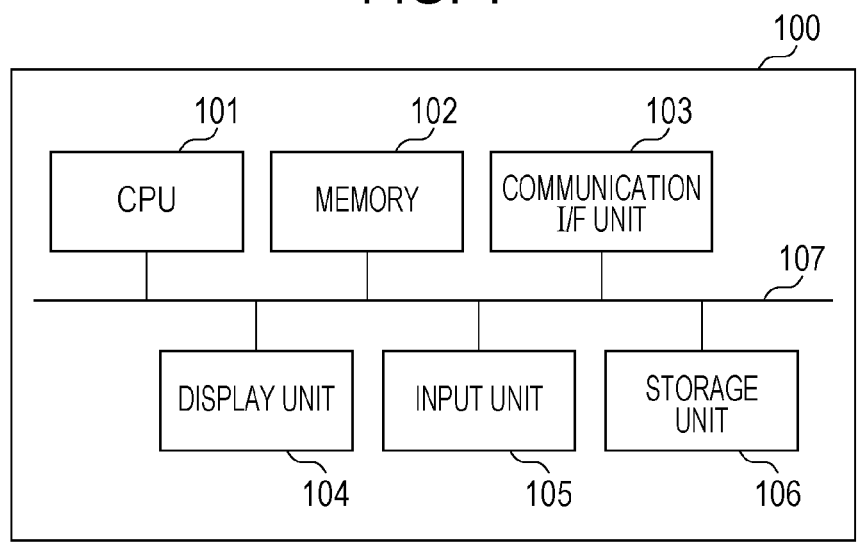
FIG. 1 is a block diagram illustrating an example of a hardware configuration of an information processing apparatus.

FIG. 1 is a block diagram illustrating an example of a hardware configuration of an information processing apparatus 100 according to the present embodiment. The information processing apparatus 100 according to the present embodiment has a function of detecting an object to be detected from an image captured by an imaging apparatus such as a surveillance camera. In this embodiment, a technique is described by way of example for a case that a human face is detected, but the present disclosure is not limited to this example and can be applied to various systems in which an image is analyzed and a particular object is detected.

The information processing apparatus 100 according to the present embodiment includes a CPU (Central Processing Unit) 101, a memory 102, a communication interface (I/F) unit 103, a display unit 104, an input unit 105, and a storage unit 106. These components are communicably connected to each other via a system bus 107. Note that the information processing apparatus 100 according to the present embodiment may further include a component in addition to those described above.

The CPU 101 controls the entire information processing apparatus 100. The CPU 101 controls the operation of each functional unit connected to the CPU, for example, via the system bus 107. The memory 102 stores data, a program, and/or the like used by the CPU 101 in processing. In addition, the memory 102 is also used as a main memory, a work area, and/or the like by the CPU 101. The functional configuration of the information processing apparatus 100 described later with reference to FIG. 2 and the process described later with reference to a flowchart shown in FIG. 3 are realized by the CPU 101 by executing a program stored in the memory 102.

The communication I/F unit 103 is an interface that connects the information processing apparatus 100 to a network. The display unit 104 includes a display member such as a liquid crystal display, and displays a result of processing performed by the CPU 101 and/or the like. The input unit 105 includes an operation member such as a mouse or a button, and inputs a user's operation to the information processing apparatus 100. The storage unit 106 stores data, a program, and/or the like that the CPU 101 needs in processing. The storage unit 106 also stores various data obtained as a result of processing performed by the CPU 101 according to the program. Part or all of the data, the program, and the like used by the CPU 101 in processing may be stored in the storage unit 106.

Figure 2:
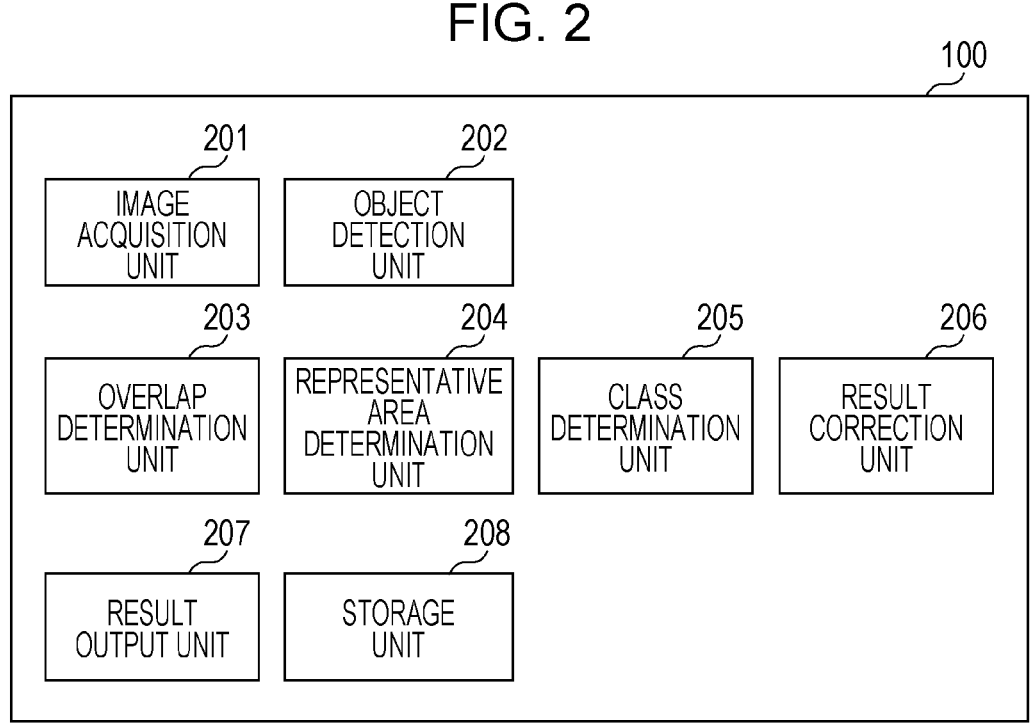
FIG. 2 is a block diagram illustrating an example of a functional configuration of an information processing apparatus.
Figure 3:
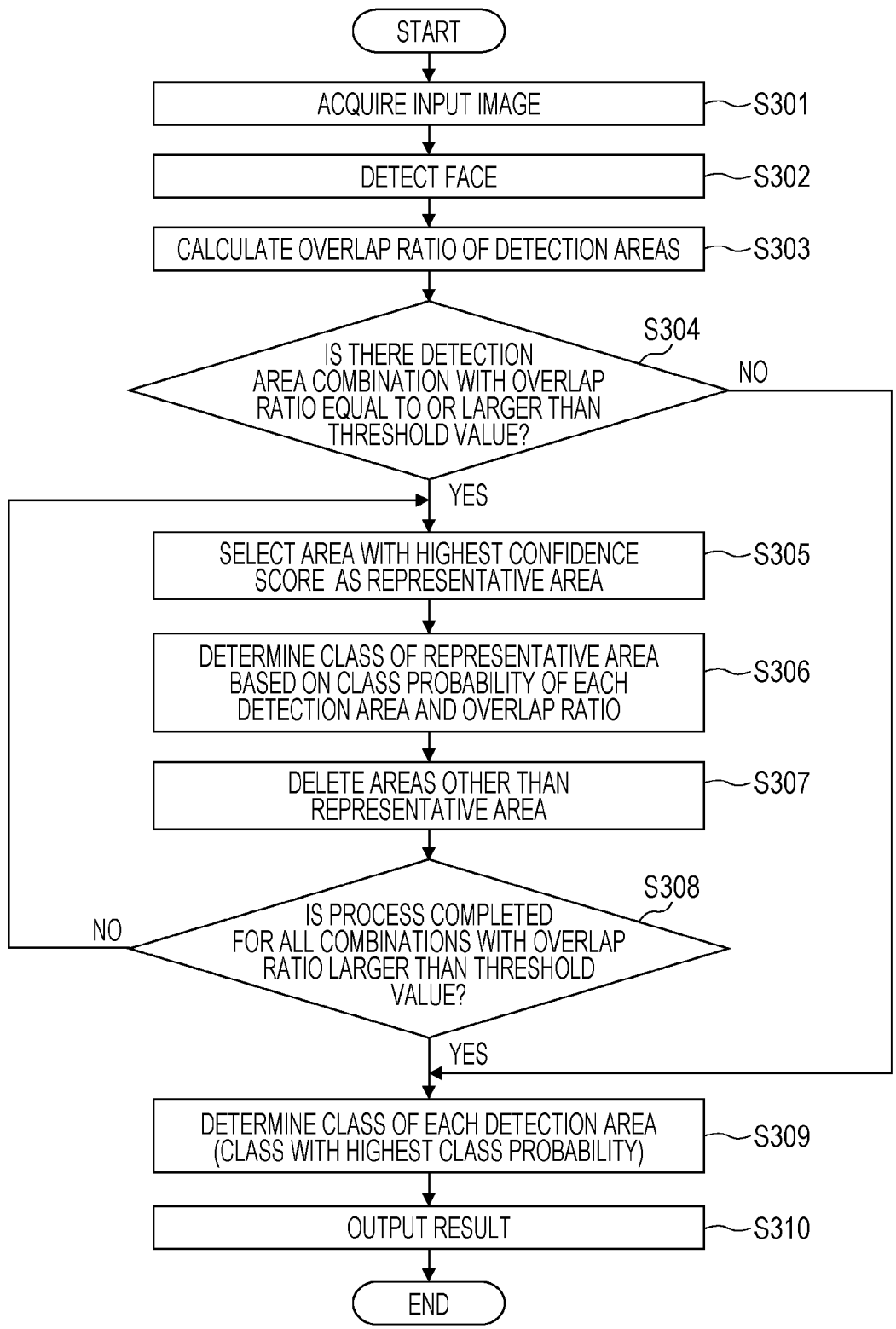
FIG. 3 is a flowchart illustrating an example of a procedure of an object detection process according to a first embodiment.

FIG. 2 is a block diagram illustrating an example of a functional configuration of the information processing apparatus 100 according to the present embodiment.

The information processing apparatus 100 includes an image acquisition unit 201, an object detection unit 202, an overlap determination unit 203, a representative area determination unit 204, an attribute determination unit 205, a result correction unit 206, a result output unit 207, and a storage unit 208.

The image acquisition unit 201 acquires an image from which an object is to be detected. In the present embodiment, the image to be subjected to the object detection is acquired from outside via the communication I/F unit 103. Hereinafter, data of an image which is acquired by the image acquisition unit 201 and is to be subjected to the object detection is also referred to simply as an "input image". In the following description, it is assumed by way of example that the input image is an RGB image of 1080×720 pixels with a horizontal width of 1080 pixels and a vertical height of 720 pixels. Note that the input image is not limited to the RGB image of 1080×720 pixels but any image may be used as the input image. For example, the horizontal width and/or vertical height may be different from the above example.

The object detection unit 202 performs an object detection with one or more attributes (classes) from an image. In the present embodiment, the object detection unit 202 detects a human face from the input image acquired by the image acquisition unit 201. The object detection unit 202 performs the face detection and outputs a detection result using a machine learning model (a learned model) that has been trained to detect a "face wearing glasses" and a "face wearing no glasses" included in the image. The detection of the "face wearing glasses" and the "face wearing no glasses" may be realized by applying a technique described, for example, by Redmon et al. (J. Redmon, A. Farhadi, "YOLO9000: Better Faster Stronger", Computer Vision and Pattern Recognition (CVPR) 2016.)

The detection result output by the object detection unit 202 includes the position and the size of the detected face (a candidate area), the confidence score of the detection, the class probabilities indicating the probabilities that the face has specific attributes (or classes), and the confidence score of the detection. The position and the size of the face are represented, for example, by coordinates defining a rectangular frame (a candidate area) surrounding the face (for example, upper left coordinates $(x_1, y_1)$ and lower right coordinates $(x_2, y_2)$ of the rectangle). The confidence score of the detection represents, for example, the confidence score of the possibility that a face is included in the rectangular frame (the candidate area) described above. The confidence score takes a real number in the range from 0 to 1, wherein 1 indicates the highest confidence. The face class probability (or attribute probability) indicates the probability of a face wearing glasses and the probability of a face wearing no glasses. Note that the sum of these probabilities is equal to 1 (100%). Hereinafter, the rectangular frame surrounding the face, the confidence score of detection, and the face class probability will also be referred to simply as a "candidate area", a "confidence score", and a "class probability," respectively. Note that the method of the detection and the output of the detection result is not limited to the example described above, and it is sufficient that the position and the range of the detected face, the confidence score of the detection, and the class probability of the face are output.

The overlap determination unit 203 determines the overlap of the detection results based on the detection results obtained by the object detection unit 202 (in particular, in terms of the position and the size of the candidate area). More specifically, the overlap determination unit 203 selects a combination of two arbitrary candidate areas from all detection results obtained by the object detection unit 202 and calculates the overlap ratio between the two candidate areas in the selected combination on a combination-by-combination basis for all combinations. The overlap determination unit 203 determines that there is an overlap if there is a combination of candidate areas for which the calculated overlap ratio is equal to or greater than a threshold value, that is, if there is a combination of candidate areas where candidate areas overlap each other with a ratio equal to greater than a predetermined value, and the overlap determination unit 203 outputs the detected combination as an "overlap-detected group". In the present embodiment, the overlap ratio is calculated by IoU (Intersection over Union), and the threshold value is set to, for example, 0.5. That is, when the value obtained by dividing the area of the common portion of the areas of the two candidate areas by the union of the areas of the two areas is equal to or greater than 0.5, the overlap determination unit 203 determines that there is an overlap. When there is no combination of candidate areas for which the overlap ratio is equal to or greater than the threshold value, the overlap determination unit 203 determines that there is no overlap.

The representative area determination unit 204 determines one candidate area as a representative area for each overlap-detected group output by the overlap determination unit 203, based on the detection results (in particular, regarding the confidence scores of the candidate areas) obtained by the object detection unit 202. More specifically, for each overlap-detected group, the representative area determination unit 204 detects a candidate area corresponding to a detection result with the highest confidence score among detection results included in the overlap-detected group, and determines the detected candidate area as the representative area of the overlap-detected group. In a case where there are a plurality of detection results having the highest confidence score, for example, a candidate area having the largest area is determined as the representative area. When there are a plurality of detection results having the highest confidence score in one overlap-detected group, the representative area may be determined based on an index other than the area of the candidate area. Note that all object detection results (candidate areas) may be sorted in descending order of the confidence score, and candidate areas located in first N positions in the sorted result or candidate areas having confidence scores equal to or greater than a threshold value may be determined as representative areas. A specific example of processing performed in this case will be described later with reference to a third embodiment.

The class (attribute) determination unit 205 determines the class of the representative area determined by the representative area determination unit 204 based on the class probability of each detection result included in the overlap-detected group. A more detailed description of the class determination process by the class determination unit 205 will be given later. The present embodiment can provide an improvement in the detection accuracy by using not only the class probability of the object in the representative area but also the class probability of the object in the candidate area overlapping the representative area.

The result correction unit 206 corrects the detection result obtained by the object detection unit 202 based on outputs provided by the overlap determination unit 203, the representative area determination unit 204, and the class determination unit 205. For each overlap-detected group output by the overlap determination unit 203, the result correction unit 206 deletes detection results other than the detection result corresponding to the representative area determined by the representative area determination unit 204. When there is a detection result whose overlap ratio with respect to any other area is smaller than the threshold value, the result correction unit 206 determines that the class with the highest class probability is the class of this detection result. By performing the result correction process described above, only one detection result corresponding to the representative area is left in each overlap-detected group, and the class thereof is given by the class determined by the class determination unit 205. The class of each of other detection results having no overlap is also determined.

The result output unit 207 outputs the result of the process performed by the result correction unit 206. The result may be given in the form of coordinates of the candidate area and class data, or an image obtained by superimposing the detection result on the input image may be output.

The storage unit 208 stores data used in processing in the units including the image acquisition unit 201 to the result output unit 207 of the information processing apparatus 100, and also stores data obtained as a result of the processing or the like.

Next, a process performed by the information processing apparatus 100 is described with reference to FIG. 3 and FIGS. 4A to 4E. FIG. 3 is a flowchart illustrating an example of a procedure of an object detection process according to the present embodiment. FIGS. 4A to 4E are diagrams for explaining the object detection process according to the present embodiment.

In step S301, the image acquisition unit 201 acquires an input image (an image to be subjected to the object detection). FIG. 4A shows an example of an input image 410 according to the present embodiment.

In the present embodiment, as described above, the input image 410 is assumed to be an image of 1080×720 pixels.

In step S302, the object detection unit 202 performs a face detection process to detect a human face to be detected from the input image. For each detected face, the confidence score and the class probability (the probability of being a "wearing glasses" class and the probability of being a "not wearing glasses" class) are output. FIG. 4B shows an example of the detection result of the face detection process on an input image, and FIG. 4C shows an example of an image in which the detection result is superimposed on the input image. In the example shown in FIG. 4B, three detection results A to C are obtained. For each of the detection results, upper left coordinates $(x_1, y_1)$ and lower right coordinates $(x_2, y_2)$ of a rectangular candidate area, the confidence score, and class probabilities (of the "wearing glasses" class and the "not wearing glasses" class) are output. In the example shown in FIG. 4C, rectangular candidate areas 411 to 413 corresponding to the detection results A to C are displayed on the display unit 104 such that the rectangular candidate areas 411 to 413 are superimposed on an input image 410.

In step S303, the overlap determination unit 203 calculates the overlap ratio of the candidate areas for each combination of arbitrary two detection results obtained for the input image. In the example shown in FIG. 4B, the upper left coordinates of the candidate areas 411 of the detection result A are obtained as (143, 165), and the lower right coordinates are obtained as (417, 418). The upper left coordinates of the candidate areas 412 of the detection result B are obtained as (166, 190), and the lower right coordinates are obtained as (450, 446). Therefore, the overlap ratio of the candidate areas between the detection result A and the detection result B is given by $$IoU(A,B)=((417-166)\times(418-190))\div((417-143)\times(418-165)+(450-166)\times(446-190)-(417-166)\times(418-190))\approx 0.67$$

The overlap ratio of candidate areas is 0 for any other combinations of detection results.

In step S304, the overlap determination unit 203 determines whether or not there is a combination of detection results for which the overlap ratio calculated in step S303 is equal to or greater than the threshold value. In a case where the overlap determination unit 203 determines that there is a combination of detection results for which the overlap ratio of the candidate areas is equal to or greater than the threshold value (YES in step S304), the overlap determination unit 203 outputs the combination of detection results (the overlap-detected group) for which the overlap ratio is equal to or greater than the threshold value. Thereafter, the processing flow proceeds to step S305. On the other hand, in a case where the overlap determination unit 203 determines that there is no combination of detection results for which the overlap ratio of the candidate areas is equal to or greater than the threshold value (NO in step S304), the processing flow proceeds to step S309. In the present embodiment, as described above, the threshold value for the overlap ratio is set to 0.5. In the present example, the overlap ratio of the candidate areas between the detection result A and the detection result B is calculated as 0.67, which is higher than the threshold value of 0.5, and thus the overlap determination unit 203 outputs the combination with the overlap ratio equal to or greater than 0.5 as the overlap-detected group (A, B), and the processing flow proceeds to step S305.

In step S305, the representative area determination unit 204 compares the confidence scores for the detection results included in the overlap-detected group output in step S304, and selects the candidate area corresponding to the detection result with the highest confidence score as the representative area of the overlap-detected group. For the overlap-detected group (A, B) in the present example, FIG. 4B indicates that the confidence score of the detection result A is 0.80, and the confidence score of the detection result B is 0.75, and thus candidate area corresponding to the detection result A with the highest confidence score is determined as the representative area.

In step S306, the class determination unit 205 determines the class of the representative area determined in step S305 based on the class probability and the overlap ratio of each detection result included in the overlap-detected group output in step S303. In the case of the overlap-detected group (A, B) in the present example, class indexes of this overlap-detected group is given by calculating the sum of class probabilities weighted by the overlap ratios (limited to the overlap ratios with the representative areas) taken for all candidate areas shown in FIG. 4B as follows.

wearing glasses class index=1×0.55+0.67×0.15≈0.65 not wearing glasses class index=1×0.45+0.67× 0.85≈1.02

Note that in the first term on the right side of the above equation, 1 is multiplied because the overlap ratio between the same areas is equal to 1.

The class with the highest class index among the calculated class indexes is determined as the class of the representative area.

In the present example, since the not wearing glasses class index is the highest one, the class of this representative area is determined as the not wearing glasses class. In a case where there are a plurality of classes with the same highest calculated class index, the class with the highest original class probability of the representative area is adopted. For example, the original information of the candidate area selected as the representative area in this example is that of the detection result A, and thus in a case where the above two class indexes have the same values, the class with the higher class probability of the detection result A, that is, the wearing glasses class is selected as the class of the representative area.

The class determination unit 205 sets the class probability of the class determined in the above-described manner to 1, and sets the other classes to 0. These class probabilities are overwritten on the respective class probabilities of the detection result corresponding to the representative area determined in step S305.

In step S307, the result correction unit 206 deletes detection results other than the detection result corresponding to the representative area in the overlap-detected group.

In step S308, the result correction unit 206 determines whether or not the process has been completed for all combinations of detection results for which the overlap ratio of the candidate areas is equal to or greater than the threshold value. When the result correction unit 206 determines that the process has been completed for all combinations of detection results whose overlap ratio is equal to or greater than the threshold value (YES in step S308), the processing flow proceeds to step S309. On the other hand, in a case where the result correction unit 206 determines that there is an unprocessed combination of detection results whose overlap ratio is equal to or greater than the threshold value (NO in step S308), the processing flow proceeds to step S305 to execute the processing in step S305 and following steps on the unprocessed combination.

In step S309, the result correction unit 206 determines the class of each detection result. For the detection result that has been selected as the representative of the overlap-detected group via the processing in steps S305 to S308, the class thereof is given by the class determined in step S306. As for the detection result for which the output in step S302 remains as it is without being subjected to the processing in steps S305 to S308, the class thereof is given by the class with the highest class probability. As a result of performing the processing in the above-described manner, one class is determined for each detection result (a candidate area), as shown in FIG. 4D.

Figures 4D, 4E:
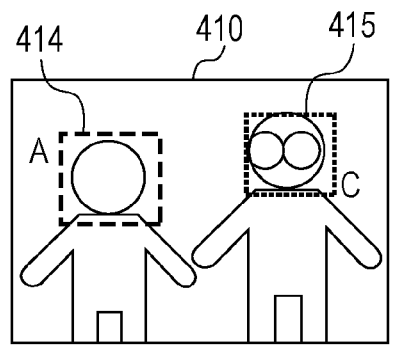

In step S310, the result output unit 207 outputs the corrected detection result data such as that shown in FIG. 4D and ends the present process on the current input image. The processing flow proceeds to a process for a next input image. The output data may be used, for example, such that candidate areas represented by rectangles are superimposed on the input image 410 as shown in FIG. 4E. In FIG. 4E, a long dashed rectangular frame 414 representing the not wearing glasses class is superimposed as the candidate area of the detection result A on the face of the person on the left side, while a dashed rectangular frame 415 representing the wearing glasses class is superimposed as the candidate area of the detection result C on the face of the person on the right side.

As described above, according to the present embodiment, in the object detection process on an input image, when a plurality of detection results overlap, they can be unified into one most suitable candidate area. Furthermore, the attribute (the class) of the unified candidate area can be determined based on the class probabilities of the plurality of detection results and the overlap ratios of the candidate areas in the state before being unified, thereby selecting the most appropriate attribute (class). This makes it possible to finally output a more appropriate detection result as the detection result of the object detection for the input image.

Note that the object detection process by the object detection unit 202 is not limited to that based on the technique disclosed by Redmon et al., but various techniques may be used as long as the techniques are capable of detecting an object to be detected. The representative area determined by the representative area determination unit 204 may be arbitrary as long as the area includes the detected object. For example, a circumscribed rectangle of the union of candidate areas included in the overlap-detected group may be defined as the representative area. For example, a circumscribed rectangle of the union of the candidate areas which are in the highest group in terms of the confidence score and/or the overlap ratio among the candidate areas included in the overlap-detected group may be defined as the representative area.

Although the present embodiment has been described above, by way of example, for a case in which two candidate areas overlap each other, but there is a possibility that three or more candidate areas overlap. For example, in a case where three detection results M, N, and O overlap, and the overlap ratio between the detection results M and N, the overlap ratio between the detection results N and O, and the overlap ratio between the detection results M and O are all equal to or greater than 0.5, the overlap determination unit 203 outputs an overlap-detected group (M, N, O) including all three detection results M, N, and O. Furthermore, for example, when the detection result M has the highest confidence score, the class determination unit 205 calculates each class index using the overlap ratio of the overlap-detected group (M, N) and the overlap ratio of the overlap-detected group (M, O) without using the overlap ratio of the overlap-detected group (N, O).

Second Embodiment

In the first embodiment described above, when a plurality of detection results overlap, the detection results are properly unified into one. A second embodiment described below discloses a method of unifying detection results when a plurality of designated regions are set on an image to be detected. In the following description, the same reference numerals are used for units similar to those in the first embodiment, and a duplicated description thereof is omitted.

Figure 5:
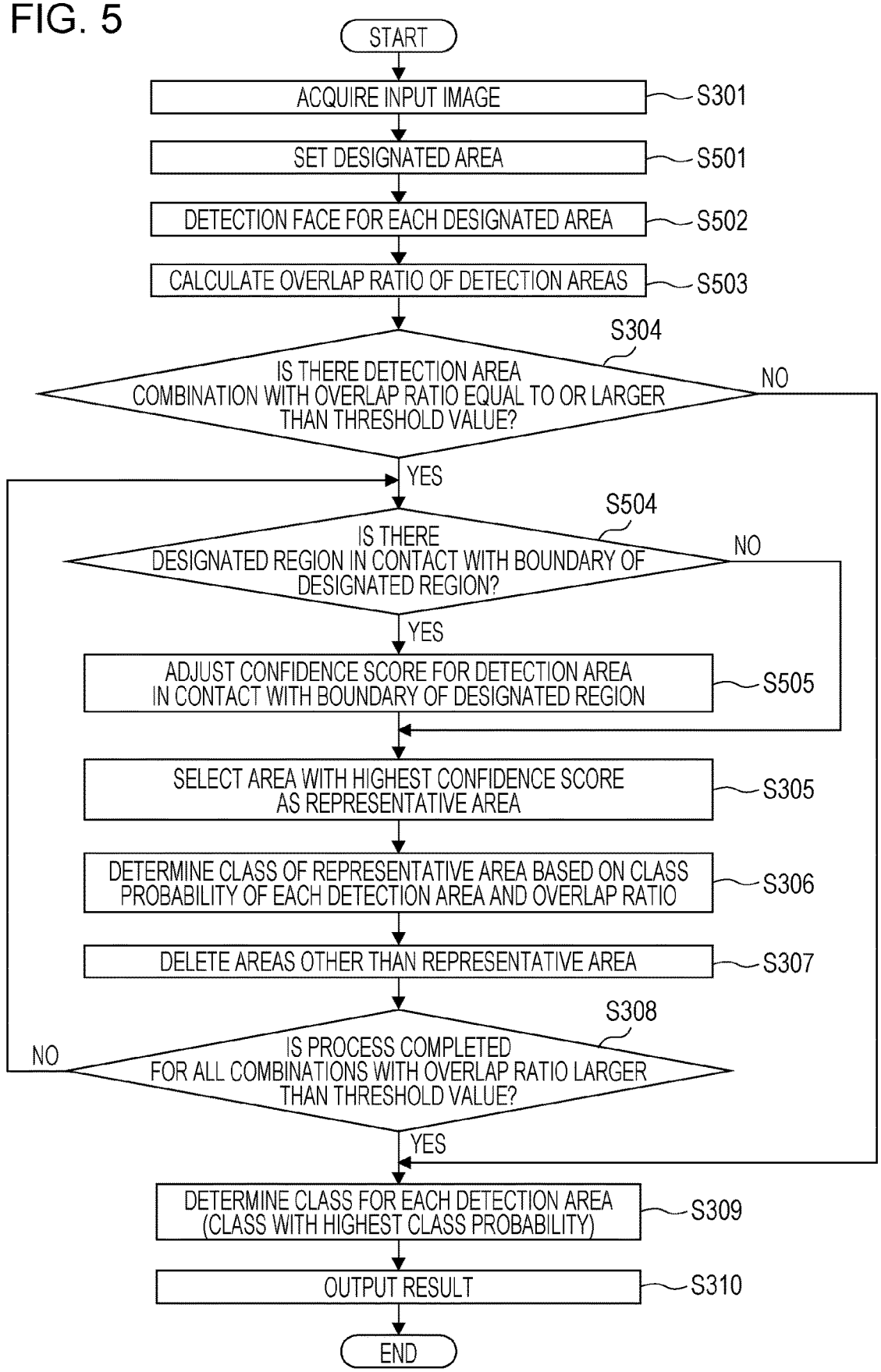
FIG. 5 is a flowchart illustrating an example of a procedure of an object detection process according to a second embodiment.

FIG. 5 is a flowchart illustrating an example of a procedure of an object detection process performed by the information processing apparatus 100 according to the second embodiment, in which steps similar to those in the flowchart shown in FIG. 3 are denoted by similar step numbers. FIGS. 6A to 6G are diagrams for explaining the object detection process according to the present embodiment.

In step S301, the image acquisition unit 201 acquires an input image (an image to be subjected to the object detection). FIG. 6A shows an example of an input image 610 according to the present embodiment.

Also in the present embodiment, as in the first embodiment, the input image 610 is assumed to be an image of 1080×720 pixels.

In step S501, the object detection unit 202 sets an area (a designated region) to be subjected to the detection in the input image. FIG. 6B shows an example in which a designated region a (611) and a designated region b (612) are set. The designated region a has upper left coordinates (99, 127) and lower right coordinates (719, 747), while the designated region b has upper left coordinates (546, 10) and lower right coordinates (1076, 540). Although there is no particular restriction on the number of designated regions that are set, it is assumed in the present example, for the sake of explanation, that two designated regions are set. In the present embodiment, the designated regions are set such that a plurality of designated regions overlap each other according to features of a seen or the like captured in the input image as shown in FIG. 6B.

Figures 6D, 6E:
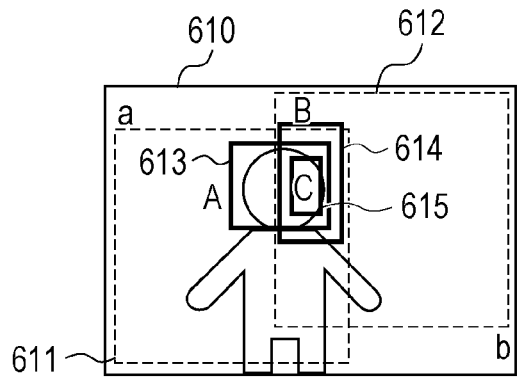

In step S502, the object detection unit 202 performs a face detection process for each designated region set in step S501. The face detection process is performed for each designated region in a similar manner to the detection process performed in step S302 in the first embodiment. FIG. 6C shows an example of a result of the face detection process for each designated region set in the input image, and FIG. 6D shows an example of an image in which the detection results are superimposed on the input image. The designated region b (612) partially includes a person in a left end part, and thus a part of the face is detected incompletely in the detection results B and C as shown in FIG. 6D. On the other hand, the same person's face is completely detected in the designated region a (611), and thus a process is performed to properly unify these detection results. In the following processes, the detection results in all designated regions are treated simultaneously. In this example, three detection results A to C are acquired. In the example shown in FIG. 6D, rectangular candidate areas 613 to 615 corresponding to the detection results A to C are displayed in the display unit 104 such that they are superimposed on the input image 610.

In step S503, the overlap determination unit 203 calculates the overlap ratio of the candidate areas for each combination of arbitrary two detection results selected from the plurality of detection results. In the first embodiment described above, the overlap ratio is defined by IoU, and the IoU threshold value in the next step S304 is set to 0.5. However, in a case where incomplete detection results are output because a part of a person's face is included in an edge area of a designated region or for other reasons, defining the overlap ratio by IoU causes the calculated overlap ratio to become low even for the detection results of the same face. For example, IoU of the candidate areas of the detection result A and the detection result B in FIG. 6C is calculated as follows:

$$IoU(A,B)=((685-546)\times(414-145))\div((685-410)\times(414-145)+(705-546)\times(440-113)-(685-546)\times(414-145))\approx0.42$$

IoU of the candidate areas of the detection result A and the detection result C is calculated as follows:

$$IoU(A,C)=((660-567)\times(384-186))\div((685-410)\times(414-145))\approx0.25$$

IoU of the candidate areas of the detection result B and the detection result C is calculated as follows:

$$IoU(B,C)=((660-567)\times(384-186))\div((705-546)\times(440-113))\approx0.20$$

Thus, when the threshold value is set to 0.5 as in the first embodiment, any calculated IoU value is smaller than the threshold value, and thus none of the combinations of the detection results A, B, and C is unified.

In the present embodiment, in view of the above, the overlap ratio is calculated using the Simpson coefficient to obtain a sufficiently high overlap ratio even for a case where one candidate area includes a larger part than the other candidate area. The overlap ratio using the Simpson coefficient is defined by a value obtained by dividing the area of a common portion of two candidate area areas by the area of the smaller one of the two candidate areas.

The Simpson coefficient of the candidate areas of the detection result A and the detection result B is calculated as follows:

$$Simpson(A,B)=((685-546)\times(414-145))\div((705-546)\times(440-113))\approx0.72$$

The Simpson coefficient of the candidate areas of the detection result A and the detection result C is calculated as follows:

$$Simpson(A,C)=1$$

The Simpson coefficient of the candidate areas of the detection result B and the detection result C is calculated as follows:

$$Simpson(B,C)=1$$

The Simpson coefficient is equal to or greater than the threshold value of 0.5 in all cases, and thus it is possible to proceed to the following unification process.

In view of the above, in step S503, the overlap determination unit 203 calculates both IoU and the Simpson coefficient as the candidate area overlap ratio. The Simpson coefficient calculated here is used in step S304 as the overlap ratio for determining whether or not the candidate area is to be subjected to the candidate area unification process executed in steps S304 to S308. On the other hand, IoU calculated here is used in step S306 as the overlap ratio in determining the class of the representative area in which a plurality of areas have been unified.

In step S304, the overlap determination unit 203 determines whether or not there is a combination of detection results for which the overlap ratio based on the Simpson coefficient calculated in step S503 is equal to or greater than the threshold value. In a case where the overlap determination unit 203 determines that there is a combination of detection results for which the overlap ratio of the candidate areas is equal to or greater than the threshold value (YES in step S304), the overlap determination unit 203 outputs the combination of detection results (the overlap-detected group) for which the overlap ratio is equal to or greater than the threshold value. The processing flow then proceeds to step S504. On the other hand, in a case where the overlap determination unit 203 determines that there is no combination of detection results for which the overlap ratio of the candidate areas is equal to or greater than the threshold value (NO in step S304), the processing flow proceeds to step S309. In the present embodiment, as described above, the threshold value for the overlap ratio is set to 0.5. In the present example, the candidate area overlap ratio (the Simpson coefficient) between the detection result A and the detection result B is 0.72, and the candidate area overlap ratio (the Simpson coefficient) between the detection result A and the detection result C and that between the detection result B and the detection result C are both 1, and thus all these candidate area overlap ratios are greater than the threshold value of 0.5. In this case, combinations with an overlap ratio equal to or greater than 0.5 are acquired as overlap-detected groups (A, B), (A, C), and (B, C), each of which is a combination having an overlap. Thus, the overlap determination unit 203 outputs the combinations with the overlap ratio equal to or greater than 0.5 as the overlap-detected group (A, B, C). The processing flow then proceeds to step S504.

In step S504, the object detection unit 202 determines whether or not there is a candidate area in contact with the boundary of the designated region among the candidate areas of the detection results included in the overlap-detected groups output in step S304. Here, the determination of whether or not the candidate area is in contact with the boundary of the designated region is performed based on whether or not one of four sides of the candidate area of each detection result is in contact with any of four sides of designated region corresponding to the detection result of interest. In the example shown in FIG. 6C and FIG. 6D, the x coordinate of the left edge of the candidate area 614 of the detection result B is 546 which is equal to the x coordinate of the left edge of the designated region b which is the designated region in which the detection result B is obtained, and thus it is determined that the candidate area 614 of the detection result B is in contact with the boundary of the designated region b. Note that the candidate area 613 of the detection result A is not in contact with the boundary of the designated region a, and the candidate area 615 of the detection result C is not in contact with the boundary of the designated region b. In a case where it is determined that there is a candidate area in contact with a boundary of a designated region (YES in step S504), information regarding the candidate area in contact with the boundary of the designated region is output, and the processing flow proceeds to step S505. On the other hand, in a case where it is determined that there is no candidate area in contact with a boundary of a designated region (NO in step S504), the processing flow proceeds to step S305.

In step S505, the object detection unit 202 performs a process of adjusting the confidence score of the detection result corresponding to the candidate area in contact with the boundary of the designated region output in step S504. The candidate area that is in contact with the boundary of the designated region can be regarded as a detection result of a part of the face, and thus it may be incomplete as face detection information. Therefore, the confidence score is adjusted in order to reduce the contribution rate to the representative area or the representative class probability when a plurality of detection results are unified. The confidence score adjustment is performed, for example, by multiplying the confidence score by a specified factor. In the present embodiment, the specified factor is set to 0.8. Since the candidate area 614 of the detection result B is in contact with the boundary of the designated region b as described above, the confidence score of 0.85 for the detection result B shown in FIG. 6C is multiplied by the specified factor of 0.8 and thus 0.68 is obtained as the adjusted confidence score. FIG. 6E shows the adjusted confidence scores for the detection results. In this example, the confidence score for the detection result B is reduced to 0.68.

Following the above-described process, the information processing apparatus 100 executes step S305 and following steps in the same manner as in the first embodiment. In the example shown in FIG. 6E, in step S305, the representative area determination unit 204 determines the candidate area 613 of the detection result A with the confidence score of 0.80 as the representative area.

In next step S306, the class determination unit 205 calculates each class index using the overlap ratios of the two overlap-detected groups (A, B) and (A, C) related to the representative area, and determines the class of the representative area. As described above, IoU is used in representing the overlap ratio used in calculating the class index in step S306, as in the first embodiment. This is because the contribution ratio of the detection result C of the candidate area 615 that is completely included in the candidate area 613 of the detection result A has a more appropriate value than the Simpson coefficient. In the example shown in FIG. 6E, the class index of each class is calculated as a sum of class indexes weighted by the overlap ratios as follows.

index of wearing glasses class=1×0.15+0.42×0.30+ 0.25×0.60≈0.426 index of not wearing glasses class=1×0.85+0.42× 0.70+0.25×0.40≈1.244

According to the above calculations, the class determination unit 205 determines the not wearing glasses class as the class of the representative area. Note that the overlap ratio of the overlap-detected group (B, C), which is not related to the representative area, is not the overlap ratio with respect to the representative area, and thus it is not used in calculating the class index.

Figures 6F, 6G:
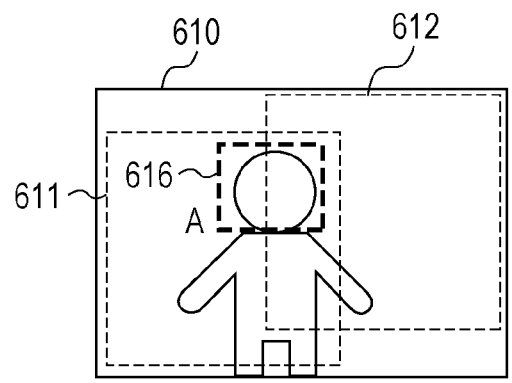

FIG. 6F shows an example of the detection result data output by the result output unit 207 in step S310. This detection result may be used, for example, such that the candidate area represented by a rectangle is superimposed on the input image 610. In the example shown in FIG. 6G, a dashed rectangle 616 representing the not wearing glasses class is superimposed on a human face.

As described above, according to the present embodiment, in a case where a plurality of designated regions are set for an input image, it is possible to appropriately unify a plurality of detection results for detection targets near the boundaries of the designated regions.

Note that the specified factor which is multiplied with the confidence score of the detection result by the object detection unit 202 in step S505 is not limited to a constant value as described above, but the specified factor may be determined based on the positional relationship between the designated region and the candidate area. For example, as conceptually shown in FIGS. 7A to 7C, the specified factor may be changed according to the number of sides where the designated region indicated by the dashed line and the candidate area indicated by the solid line are in contact with each other. For example, in the example shown in FIG. 7A, the number of sides where the designated region and the candidate area are in contact with each other is 0, and thus the specified factor is set to 1. In the example shown in FIG. 7B, the number of contacting sides is 1, and thus the specified factor is set to 0.8. In the example shown in FIG. 7C, the number of contacting sides is 2, and thus the specified factor is set to 0.6.

Alternatively, the positional relationship between the designated region and the candidate area may be classified as shown in FIGS. 7D to 7G, and the specified factor may be set according to the length of the side of the candidate area that is in contact with the boundary of the designated region relative to the outer circumference length of the candidate area as follows. For example, the specified factor may be given by 1−((the length of the contacting side)÷(the length of the perimeter)). In the case shown in FIG. 7D, the specified factor=1. In the case shown in FIG. 7E, the specified factor=0.88. In the case shown in FIG. 7F, the specified factor=0.63. The specified factor=0.5. The specified factor may be determined according to other geometric properties.

Third Embodiment

A third embodiment described below discloses a method of changing the order of unifying a plurality of detection results and performing the unification process based on the confidence scores of the detection results. In the following description, the same reference numerals are used for units similar to those in the first or second embodiment, and a duplicated description thereof is omitted.

FIG. 8A is a flowchart illustrating an example of a procedure of an object detection process performed by the information processing apparatus 100 according to the third embodiment, in which steps similar to those in the flowchart shown in FIG. 3 or FIG. 5 are denoted by similar step numbers. FIGS. 10A to 10J are diagrams for explaining the object detection process according to the present embodiment.

Figures 10A, 10B:
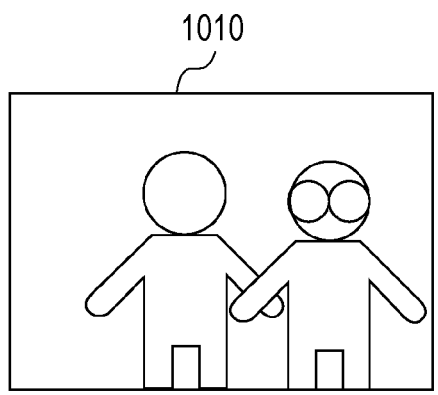

In step S301, the image acquisition unit 201 acquires an input image. FIG. 10A shows an example of an input image 1010 according to the present embodiment. Also in the present embodiment, as in the first embodiment, the input image 1010 is assumed to be an image of 1080×720 pixels.

Figures 10C, 10D:
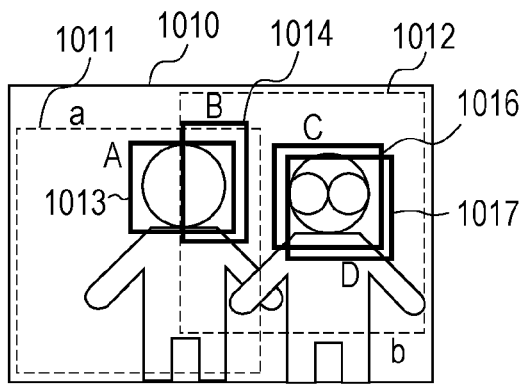

In step S302, the object detection unit 202 performs a face detection process for detecting a human face to be detected from the input image. For each detected face, the confidence score and the class probability are output. Note that in a case where a plurality of designated regions are set as in the second embodiment, steps S501 and S502 shown in FIG. 5 are performed instead of step S302. In FIGS. 10A to 10J, it is assumed that the processes in steps S501 and S502 shown in FIG. 5 are performed. FIG. 10B shows an example of a result of the face detection process for each designated region set in the input image, and FIG. 10C shows an example of an image in which the detection results are superimposed on the input image. As shown in FIG. 10C, two designated regions a (1011) and b (1012) are set, and four detection results A to D are obtained. In the example shown in FIG. 10C, rectangular candidate areas 1013, 1014, 1016, and 1017 corresponding to the detection results A to D are displayed on the display unit 104 such that the rectangular candidate areas are superimposed on the input image 1010.

In step S810, the object detection unit 202 performs a confidence score adjustment process. Details thereof will be described later with reference to FIG. 8B. Note that in a case where a plurality of designated regions are not set as in the first embodiment, this process may not be performed.

In step S820, the representative area determination unit 204 performs a processing order list generation process. Details thereof will be described later with reference to FIG. 8C.

In step S900, the overlap determination unit 203, the representative area determination unit 204, and the class determination unit 205 perform the area unification process. Details thereof will be described later with reference to FIG. 9.

In step S310, the result output unit 207 outputs detection result data.

FIG. 8B is a flowchart showing an example of a detailed procedure of the confidence score adjustment process in step S810.

In step S811, the object detection unit 202 determines whether or not the confidence score adjustment process is completed for all detection results. In a case where the object detection unit 202 determines that the confidence score adjustment process is completed for all detection results (YES in step S811), the confidence score adjustment process shown in FIG. 8B is ended. On the other hand, in a case where the object detection unit 202 determines that there is one or more detection results that have not been subjected to the confidence score adjustment process (NO in step S811), the processing flow proceeds to step S812 to perform the confidence score adjustment process on a next detection result.

In step S812, the object detection unit 202 defines the positional relationship between the candidate area included in the detection result to be processed and the designated region used in this detection. As described in the second embodiment with reference to FIGS. 7A to 7G, the positional relationship is defined by the number of sides where the outer periphery of the candidate area and the outer periphery of the designated region are in contact with each other or by the relative length where contacting occurs.

In step S813, the object detection unit 202 adjusts the confidence score of the detection result to be processed according to the positional relationship defined in step S812. This adjustment is also performed in the manner described above in the second embodiment with reference to FIGS. 7A to 7G. After that, the processing flow returns to step S811, and if there is a detection result to be processed next, steps S812 and S813 are repeated to perform the confidence score adjustment process until all detection results have been processed.

FIG. 10D shows an example of the detection result obtained by performing the confidence score adjustment process on the example of the detection result shown in FIG. 10B. In this example in FIG. 10D, the confidence score of the detection result B, in which one side of the candidate area overlaps the designated region b, is reduced from 0.85 to 0.68.

FIG. 8C is a flowchart showing an example of a detailed procedure of the processing order list generation process in step S820.

In step S821, the representative area determination unit 204 sorts the confidence scores of all detection results in descending order. In a case where detection results A to D shown in FIG. 10D are given, the confidence scores are respectively 0.80, 0.68, 0.85, and 0.75, and thus they are sorted as C, A, D, B in descending order of the confidence score.

In step S822, the representative area determination unit 204 describes the result of the sorting performed in step S821 into the form of a list, and stores the resultant list as a processing order list in the storage unit 208. FIG. 10E shows an example of the stored processing order list. In this example, only the correspondence between the order and the detection result is described in the form of a list, but the list may also include the coordinate information, the confidence scores, and class probabilities of the candidate areas included in the detection results.

Figure 9:
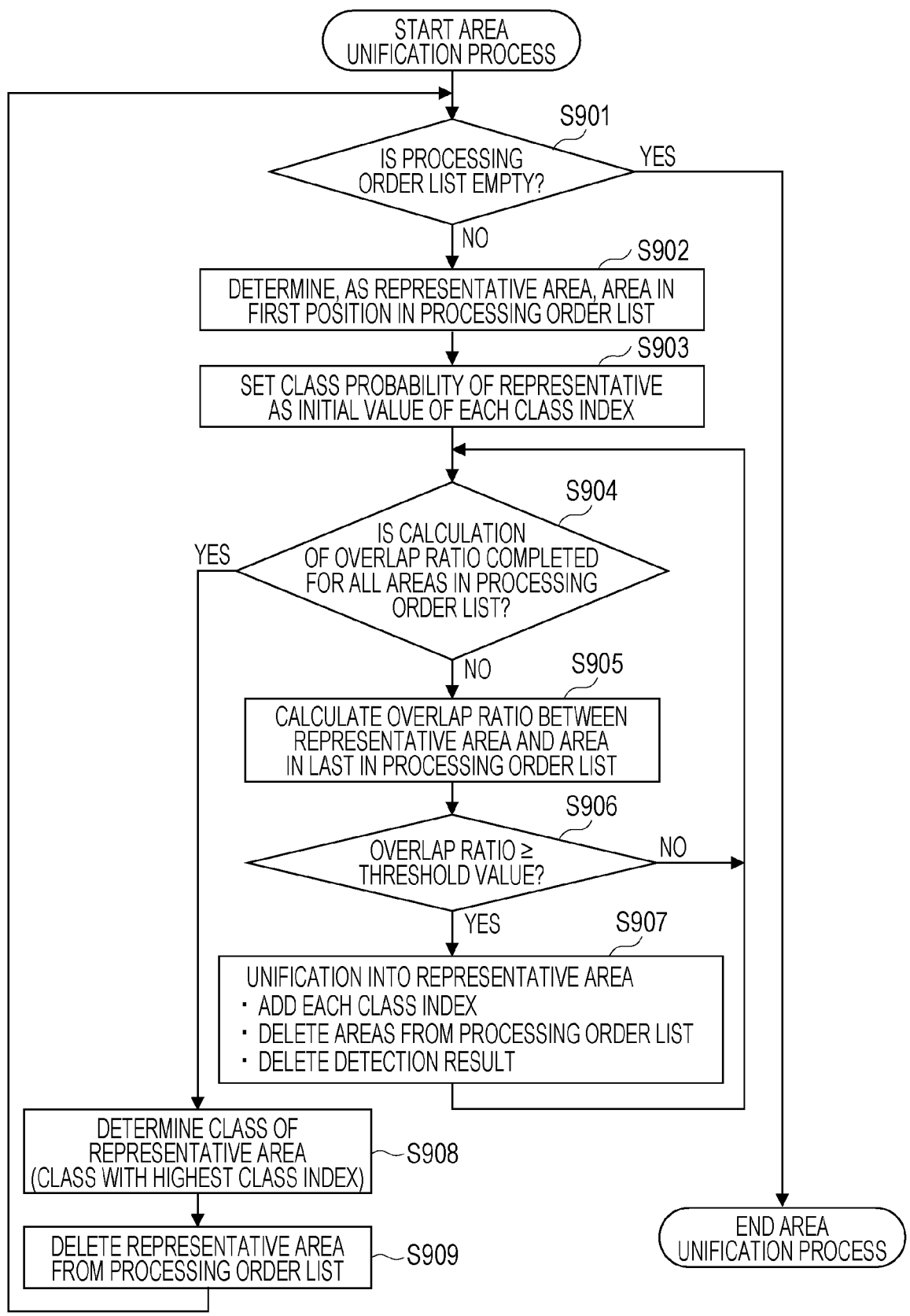
FIG. 9 is a flowchart illustrating an example of a detailed procedure of a representative area unification process according to the third embodiment.

FIG. 9 is a flowchart illustrating an example of a detailed procedure of the area unification process in step S900.

In step S901, the representative area determination unit 204 determines whether or not the processing order list generated in step S822 includes a detection result to be processed. In a case where the representative area determination unit 204 determines that the processing order list is empty and it does not include any detection results to be processed (YES in step S901), the area unification process is ended. On the other hand, in a case where the representative area determination unit 204 determines that the processing order list includes a detection result to be processed (NO in step S901), the processing flow proceeds to step S902.

In step S902, the representative area determination unit 204 sets, as the representative area, a candidate area corresponding to a detection result in the first position of the processing order list. For example, in a case where the processing order list shown in FIG. 10E is given, since the detection result C is in the first position in the processing order list, a candidate area 1016 of the detection result C is set as the representative area. The following steps S903 to S909 are steps for determining candidate areas to be unified into the representative area set here and unifying them.

In step S903, the representative area determination unit 204 sets each class probability of the representative area determined in step S902 as the initial value of each class index for the representative area. For example, referring to FIG. 10D, the class probabilities corresponding to the candidate area 1016 of the detection result C selected as the representative area are such that the probability of the wearing glasses class is 0.55 and the probability of the not wearing glasses class is 0.45. Therefore, the initial values of the class indexes for the representative area are set such that 0.55 is set for the wearing glasses class and 0.45 is set for the not wearing glasses class.

In step S904, the overlap determination unit 203 determines whether or not there is a detection result in the processing order list for which the overlap ratio with respect to the representative area has not yet been calculated. In a case where the overlap determination unit 203 determines that the overlap ratio with respect to the representative area has been calculated for all the detection results in the processing order list (YES in step S904), the processing flow proceeds to step S908. On the other hand, in a case where the overlap determination unit 203 determines that there is a detection result in the processing order list for which the overlap ratio with respect to the representative area has not been calculated yet (NO in step S904), the processing flow proceeds to step S905.

In step S905, the overlap determination unit 203 calculates the overlap ratio between the representative area and a candidate area corresponding to one of the detection results located in a position lower than that of the representative area in the processing order list. One of the detection results located in a position lower than that of the representative area in the processing order list may be sequentially selected in descending processing order from those for which the overlap ratio has not yet been calculated. In the case of the processing order list shown in FIG. 10E, the calculation is first performed for the overlap ratio between the representative area (the candidate area 1016 of the detection result C) and a candidate area 1013 of the detection result A. As can be seen from FIG. 10C, the overlap ratio between these two areas is 0. Note that when a plurality of designated regions are set as in the example shown FIG. 10A to 10J, the overlap ratios are calculated using both IoU and the Simpson coefficient as in the second embodiment. However, in a case where a plurality of designated regions are not set as in the first embodiment, the overlap ratio is calculated using IoU.

In step S906, the overlap determination unit 203 determines whether or not the overlap ratio calculated in step S905 is equal to or greater than the predetermined threshold value. Note that when a plurality of designated regions are set as in the example shown FIG. 10A to 10J, the overlap ratio based on the Simpson coefficient is compared with the threshold value as in the second embodiment. In a case where a plurality of designated regions are not set, the overlap ratio based on IoU is compared with the threshold value as in the first embodiment. In a case where the overlap determination unit 203 determines that the overlap ratio is smaller than the threshold value (NO in step S906), this combination is not to be subjected to the area unification, and thus the processing flow returns to step S904 to perform the processing on a next detection result in the processing order list. On the other hand, in a case where the overlap determination unit 203 determines that the overlap ratio is equal to or greater than the threshold value (YES in step S906), this combination is to be subjected to the area unification, and thus the processing flow proceeds to step S907. In the example shown in FIGS. 10A to 10J, the overlap ratio between the representative area (the candidate area 1016) and the candidate area 1013 of detection result A is 0, and thus the result of the determination in step S906 is NO. The overlap ratio between the representative area and the candidate area 1017 of the detection result D in the next position in the processing order is equal to or higher than the threshold value, and thus the result of the determination in step S906 is YES.

In step S907, the representative area determination unit 204 and the class determination unit 205 perform the unification process to unify candidate areas determined to be subjected to the unification. In the unification process into the representative area, the class determination unit 205 calculates the values obtained by multiplying each class probability of the candidate areas to be unified with the representative area by the overlap ratio (IoU), and adds the resultant values to each class index of the representative area. Furthermore, the representative area determination unit 204 deletes detection results corresponding to the unified candidate areas from the processing order list, and further deletes the detection results. In the example shown in FIGS. 10A to 10J, the candidate area 1017 of the detection result D is unified into the representative area. That is, the value obtained by multiplying the probability of the each class of the detection result D by the overlap ratio with respect to the representative area is added to the index of each class of the representative area, and the detection result D is deleted from the processing order list. FIG. 10F shows the resultant processing order list. Furthermore, the information about the detection result D is deleted from FIG. 10D. When the process of unification into the representative area is completed, the processing flow returns to step S904 to perform the process on a next detection result in the processing order list.

After that, in the example in FIG. 10A to 10J, the calculation is performed to determine the overlap ratio between the representative area of the detection result C and the candidate area 1014 corresponding to the detection result B located in a lower position in the processing order list, and the overlap ratio is calculated as 0. Therefore, the candidate area 1014 of the detection result B is not unified with the representative area.

When the overlap ratios between one representative area and the other candidate areas are calculated, and the area unification process is performed as required in the above-described manner. When the process is completed, the processing flow proceeds from step S904 to step S908. In step S908, the class determination unit 205 selects a class having the maximum class index value among the class indexes calculated in step S903 or S907 and determines the selected class as the class of the representative area. In the example in FIGS. 10A to 10J, the class of the representative area of the detection result C is determined as the "wearing glasses" class.

Next, in step S909, the representative area determination unit 204 deletes, from the processing order list, the detection result corresponding to the representative area for which the process described above has been completed. In the example in FIGS. 10A to 10J, the representative area is the candidate area 1016 of the detection result C, and thus the detection result C is deleted from the processing order list. FIG. 10G shows the resultant processing order list. Then, the processing flow returns to step S901 to perform the processing on a next representative area. In the following processes, the candidate area 1013 of detection result A, which is now in the first position in the processing order list, is set as the representative area, and area unification process is performed on the detection result B. As a result, the processing order list becomes as shown in FIG. 10H. Next, in step S908, the class of the representative area of the detection result A is determined as the "not wearing glasses" class, and detection result A is deleted from the processing order list in step S908. As a result, in step S901, it is determined that the processing order list is empty, and the processing shown in FIG. 9 is ended.

Figures 10I, 10J:
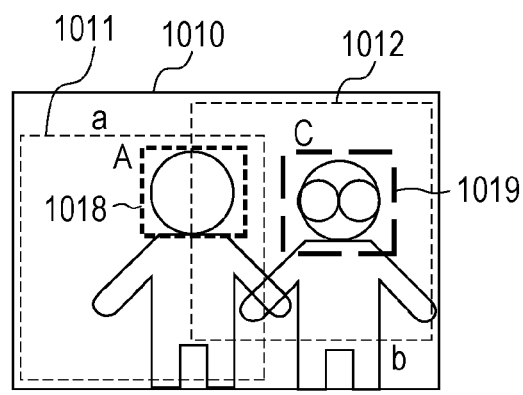

Next, in step S310 in FIG. 8A, the result output unit 207 outputs the detection result data. FIG. 10I shows an example of detection result data. When the input image shown in FIG. 10A is given and the detection results shown in of FIG. 10I are output, if the detection results are superimposed on the input image, then the result is as shown in 10J. In FIG. 10J, the not wearing glasses class is expressed by a dashed rectangle 1018, and the wearing glasses class is expressed by a long dashed rectangle 1019.

As described above, in the present embodiment, the order in which a plurality of detection results are unified is determined based on the confidence score, and the overlap ratio is calculated always on a one-to-one basis and the area unification process is executed each time the overlap ratio is calculated. Thus, the process executed is simple even when there are a large number of areas to be subjected to the unification process, which results in a further improvement in the computational efficiency.

Other Embodiments

The present disclosure can also be realized by performing processing such that a program for realizing one or more functions of one of the above-described embodiments is supplied to a system or an apparatus via a network or a storage medium, and the program is read out and executed by one or more processors in a computer of the system or the apparatus. The present disclosure can also be realized by a circuit (for example, an ASIC circuit) for realizing one or more functions.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2021-172887 filed Oct. 22, 2021 and No. 2021-172888 filed Oct. 22, 2021, which are hereby incorporated by reference herein in their entirety.

What is claimed is:

1. An information processing apparatus comprising:
  an object detection unit configured to detect, from an image, a candidate area in which an object is included and a candidate attribute of the object corresponding to the candidate area;
  an overlap determination unit configured to, in a case where a plurality of candidate areas exist, acquire an overlap ratio between the plurality of candidate areas;
  a representative area determination unit configured to set a representative area of the plurality of candidate areas based on a confidence score indicating a probability that an object is included in the candidate area;
  an attribute determination unit configured to determine an attribute of an object in the representative area based on a probability of an attribute of the object included in the candidate area whose overlap ratio with respect to the representative area is equal to or greater than a threshold value and the overlap ratio with respect to the representative area; and
  a result correction unit configured to delete the candidate area whose overlap ratio with respect to the representative area is equal to or greater than the threshold value,
  wherein the object detection unit is configured to:
  set a plurality of designated regions on the image;
  detect, for each of the plurality of designated regions, a candidate area in which the object exists, and acquire a candidate attribute of each object;

acquire, for each of the detected plurality of candidate areas, a confidence score indicating a possibility that an object is included in a candidate area; and adjust the confidence score based on a geometric characteristic in the set designated region, wherein the overlap determination unit is configured to acquire a first overlap ratio, which is given by a numerical value obtained by dividing an area of a common portion of two areas by an area of a smaller area among the two areas, and a second overlap ratio, which is given by a numeral value obtained by dividing the area of the common portion of the two areas by a union of areas of the two areas, wherein the candidate area whose first overlap ratio with respect to the representative area is equal to or greater than a threshold value is deleted, and wherein the attribute determination unit is configured to determine an attribute of the representative area based on the probability of the attribute of the object included in the candidate area and the second overlap ratio with respect to the representative area.

2. The information processing apparatus according to claim 1, wherein the attribute determination unit is configured to determine the attribute of the object in the representative area by calculating a sum of weighted probabilities of attributes of the object in the candidate area and the representative area where the weighted probabilities are given by the probabilities weighted by the overlap ratio with respect to the representative area, and determining an attribute having a largest sum as the attribute of the object of in the representative area.

3. The information processing apparatus according to claim 1,
wherein the overlap determination unit is configured to acquire a combination of candidate areas whose overlap ratio is equal to or greater than the threshold value,
wherein the representative area determination unit sets the representative area for each combination of candidate areas acquired, by the overlap determination unit.

4. An information processing apparatus, comprising:
an object detection unit configured to detect, from an image, a candidate area in which an object is included and a candidate attribute of the object corresponding to the candidate area;
a representative area determination unit configured to set a representative area based on a confidence score indicating a possibility that an object is included in the candidate area;
an overlap determination unit configured to select a candidate area overlapping the representative area with an overlap ratio equal to or larger than a threshold value; and
an attribute determination unit configured to determine an attribute of the object in the selected representative area based on a candidate attribute of the object in the selected candidate area and a candidate attribute of the object in the representative area,
wherein the object detection unit is configured to:
set a plurality of designated regions on the image;
detect, for each of the plurality of designated regions, a candidate area in which the object exists, and acquire a candidate attribute of each object;
acquire, for each of the detected plurality of candidate areas, a confidence score indicating a possibility that an object is included in a candidate area; and
adjust the confidence score based on a geometric characteristic in the set designated region, wherein the overlap determination unit is configured to acquire a first overlap ratio, which is given by a numerical value obtained by dividing an area of a common portion of two areas by an area of a smaller area among the two areas, and a second overlap ratio, which is given by a numeral value obtained by dividing the area of the common portion of the two areas by a union of areas of the two areas, wherein the candidate area whose first overlap ratio with respect to the representative area is equal to or greater than a threshold value is deleted, and wherein the attribute determination unit is configured to determine an attribute of the representative area based on the probability of the attribute of the object included in the candidate area and the second overlap ratio with respect to the representative area.

5. An information processing apparatus, according to claim 4, further comprising:
a result correction unit configured to unify a detection result of an object in the input image into the representative area by deleting the selected candidate area; and
output means configured to output a position of the representative area and the attribute of the object in the representative area.

6. An information processing apparatus, according to claim 4, wherein the attribute determination unit is configured to determine an attribute of the object in the representative area based on an overlap ratio with respect to the representative area and a candidate attribute of the object in the representative area.

7. The information processing apparatus according to claim 1, wherein the confidence score is adjusted using a coefficient according to a positional relationship between the designated region and the candidate area.

8. The information processing apparatus according to claim 1, wherein the confidence score is adjusted using a coefficient according to a ratio of a length of the candidate area which is in contact with of an outer periphery of the designated region.

9. A method of controlling an information processing apparatus, the method comprising:
detecting, from an image, a candidate area in which an object is included and a candidate attribute of the object corresponding to the candidate area;
acquiring, in a case where a plurality of candidate areas exist, an overlap ratio between the plurality of candidate areas;
performing unification by setting, as a representative area, a candidate area with a highest confidence score in terms of a possibility that an object is included in the candidate area, and deleting a candidate area whose overlap ratio with respect to the representative area is equal to or greater than a threshold value;
determining an attribute of an object in the representative area based on a probability of an attribute of the object included in the candidate area and the overlap ratio with respect to the representative area;
setting a plurality of designated regions on the image;
detecting, for each of the plurality of designated regions, a candidate area in which the object exists, and acquire a candidate attribute of each object;
acquiring, for each of the detected plurality of candidate areas, a confidence score indicating a possibility that an object is included in a candidate area;
adjusting the confidence score based on a geometric characteristic in the set designated region; and acquiring a first overlap ratio, which is given by a numerical value obtained by dividing an area of a common portion of two areas by an area of a smaller area among the two areas, and a second overlap ratio, which is given by a numeral value obtained by dividing the area of the common portion of the two areas by a union of areas of the two areas, wherein the candidate area whose first overlap ratio with respect to the representative area is equal to or greater than a threshold value is deleted, and wherein an attribute of the representative area is determined based on the probability of the attribute of the object included in the candidate area and the second overlap ratio with respect to the representative area.

10. The method of controlling the information processing apparatus, according to claim 9, the method further comprising:

setting a plurality of designated regions on the image;

detecting a candidate area in which an object exists from each designated region set in the setting, and acquiring a candidate attribute of the object;

acquiring a confidence score indicating a possibility that an object is included in the candidate area for each acquired candidate area; and adjusting the confidence score based on a geometric characteristic in a designated region set in the setting, wherein the representative area is set based on confidence scores including the adjusted confidence score.

11. A non-transitory computer-readable storage medium storing a program configured to cause a computer to execute an information processing method, the method comprising:

detecting, from an image, a candidate area in which an object is included and a candidate attribute of the object corresponding to the candidate area;

acquiring, in a case where a plurality of candidate areas exist, an overlap ratio between the plurality of candidate areas;

performing unification by setting, as a representative area, a candidate area with a highest confidence score in terms of a possibility that the object is included in the candidate area, and deleting a candidate area whose overlap ratio with the representative area is equal to or greater than a threshold value; and determining an attribute of an object in the representative area based on a probability of an attribute of the object included in the candidate area and the overlap ratio with the representative area;

setting a plurality of designated regions on the image;

detecting, for each of the plurality of designated regions, a candidate area in which the object exists, and acquire a candidate attribute of each object;

acquiring, for each of the detected plurality of candidate areas, a confidence score indicating a possibility that an object is included in a candidate area; and adjusting the confidence score based on a geometric characteristic in the set designated region, wherein a first overlap ratio is acquired, which is given by a numerical value obtained by dividing an area of a common portion of two areas by an area of a smaller area among the two areas, and a second overlap ratio, which is given by a numeral value obtained by dividing the area of the common portion of the two areas by a union of areas of the two areas, wherein the candidate area whose first overlap ratio with respect to the representative area is equal to or greater than a threshold value is deleted, and wherein an attribute of the representative area is determined based on the probability of the attribute of the object included in the candidate area and the second overlap ratio with respect to the representative area.

* * * * *